United States Patent
Hunt

(10) Patent No.: US 9,285,586 B2
(45) Date of Patent: Mar. 15, 2016

(54) ADJUSTING PARALLAX BARRIERS

(75) Inventor: Alexander Hunt, Tygelsjo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 181 days.

(21) Appl. No.: 13/823,862

(22) PCT Filed: May 13, 2011

(86) PCT No.: PCT/IB2011/052119
§ 371 (c)(1),
(2), (4) Date: Mar. 15, 2013

(87) PCT Pub. No.: WO2012/156778
PCT Pub. Date: Nov. 22, 2012

(65) Prior Publication Data
US 2013/0187961 A1    Jul. 25, 2013

(51) Int. Cl.
G02B 27/00 (2006.01)
H04N 13/04 (2006.01)

(52) U.S. Cl.
CPC ........ G02B 27/0093 (2013.01); H04N 13/0409 (2013.01); H04N 13/0472 (2013.01); H04N 13/0497 (2013.01)

(58) Field of Classification Search
CPC .................................................. G02B 27/0093
See application file for complete search history.

(56) References Cited

U.S. PATENT DOCUMENTS

2002/0015007 A1    2/2002  Perlin et al.
2005/0264651 A1*  12/2005  Saishu et al. ............. 348/51
2010/0189413 A1    7/2010  Yoshino
2011/0157697 A1*   6/2011  Bennett et al. ............ 359/462
2011/0159929 A1*   6/2011  Karaoguz et al. .......... 455/566

FOREIGN PATENT DOCUMENTS

WO    2011044936 A1    4/2011

OTHER PUBLICATIONS

International Search Report dated Jan. 11, 2012 issued in corresponding PCT application No. PCT/IB2011/052119, 10 pages.
International Preliminary Report and Written Opinion dated Nov. 28, 2013, issued in corresponding PCT application No. PCT/IB2011/052119, 6 pages.

* cited by examiner

Primary Examiner — Aneeta Yodichkas
Assistant Examiner — Karin Kiyabu
(74) Attorney, Agent, or Firm — Tucker Ellis LLP

(57) ABSTRACT

A device may determine a first distance between a viewer and a display of a device. The display may include a first parallax barrier including a plurality of parallax barrier clusters. Each of the parallax barrier clusters includes a plurality of parallax barrier elements that are parallel to one another and parallel to the parallax barrier clusters. The device may also determine a second distance between a right eye of the viewer and a left eye of the viewer, and move parallax barrier elements to control spacing between the parallax barrier clusters based on the first distance and the second distance. Furthermore, the device may send, from the display, light rays of a right-eye image of a stereoscopic image and a left-eye image of the stereoscopic image to a right eye of the viewer and a left eye of the viewer, respectively, through the spacing between the parallax barrier clusters.

16 Claims, 12 Drawing Sheets

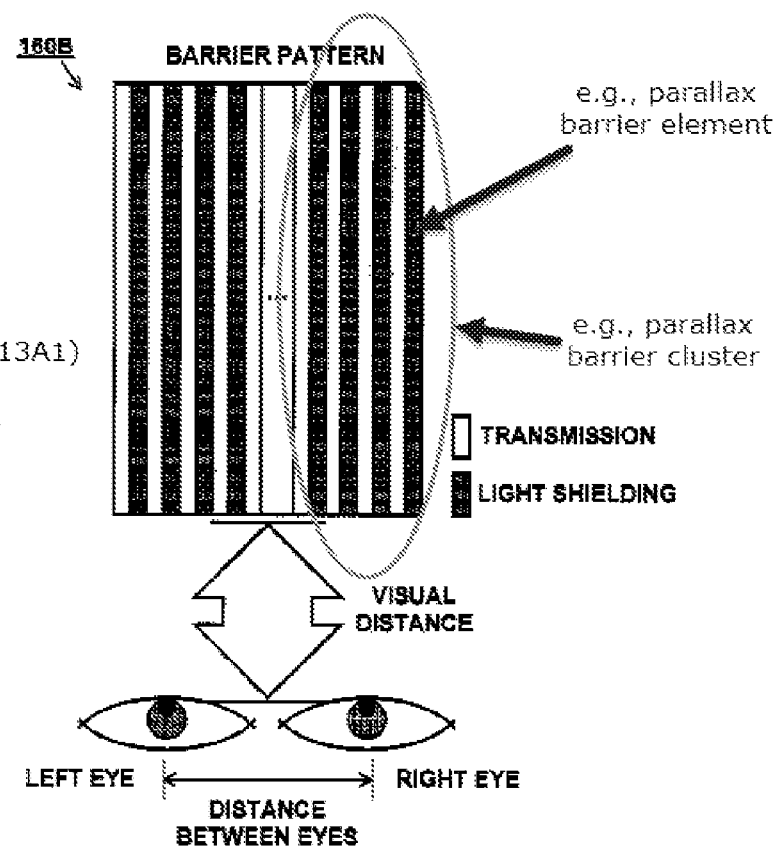

ADJUSTING PARALLAX BARRIERS

BACKGROUND

A three-dimensional (3D) display may provide a stereoscopic effect (e.g., an illusion of depth) by rendering two slightly different images, one image for the right eye (e.g., a right-eye image) and the other image for the left eye (e.g., a left-eye image) of a viewer. When each of the eyes sees its respective image on the display, the viewer may perceive a stereoscopic image.

SUMMARY

According to one aspect, a device may include a display screen to display a stereoscopic image to a viewer, the stereoscopic image comprising a right-eye image and a left-eye image. The device may also include a sensor to measure a first distance between the viewer and the device. Furthermore, the device may include a first parallax barrier that covers a surface of the display screen, the surface transmitting the stereoscopic image toward the viewer. The first parallax barrier may include a plurality of parallax barrier clusters that are parallel to one another, and each of the parallax barrier clusters may include a plurality of parallax barrier elements that are parallel to one another. In addition, the device may include one or more processors configured to determine the first distance based on output from the sensor, determine a second distance between a right eye of the viewer and a left eye of the viewer, move the parallax barrier elements to change spacing between the parallax barrier clusters based on the first distance and the second distance, and send, from the display screen through the spacing between the parallax barrier clusters, light rays from the right-eye image toward the right eye of the viewer and light rays from the left-eye image toward the left eye of the viewer.

Additionally, the device may include a tablet computer; a cellular phone; or a laptop computer.

Additionally, the device may further include a camera to capture an image of a face of the viewer. The one or more processors may be further configured to auto-focus the image of the face, detect an image of the left eye in the image of the face, detect an image of the right eye in the image of the face, and determine the second distance between the right eye and the left eye based on the detected images of the right eye and the left eye.

Additionally, the sensor may include a sensor for auto-focusing the camera.

Additionally, the sensor may include one of an infrared sensor, an ultrasound sensor, a range-finder, or a proximity sensor.

Additionally, the device may further include a second parallax barrier that overlays the first parallax barrier. The second parallax barrier mayt include parallax barrier clusters that run perpendicularly to the first parallax barrier clusters.

Additionally, the one or more processors may be further configured to turn the first parallax barrier transparent when the device is in a portrait mode; and turn the second parallax barrier transparent when the device is in a landscape mode.

Additionally, the one or more processors may be further configured to determine an angle between light rays from the right eye image to the right eye of the viewer and light rays from the left-eye image to the left eye of the viewer.

Additionally, the first parallax barrier may include an upper layer and a lower layer, and each of the parallax barrier clusters may include parallax barrier elements that belong to either the upper layer or the lower layer.

According to another aspect, a method may include determining a first distance between a viewer and a display of a device. The display may include a first parallax barrier including a plurality of parallax barrier clusters. Each of the parallax barrier clusters may include a plurality of parallax barrier elements that are parallel to one another and parallel to the parallax barrier clusters. The method may further include determining a second distance between a right eye of the viewer and a left eye of the viewer, moving parallax barrier elements to control spacing between the parallax barrier clusters based on the first distance and the second distance, and sending, from the display, light rays of a right-eye image of a stereoscopic image and a left-eye image of the stereoscopic image to a right eye of the viewer and a left eye of the viewer, respectively, through the spacing between the parallax barrier clusters.

Additionally, determining the first distance may include measuring the first distance based on an auto-focusing component.

Additionally, determining the second distance between the right eye of the viewer and the left eye of the viewer may include detecting an image of a right eye in an image of a face of the viewer, detecting an image of a left eye in the image of the face of the viewer, and determining the second distance based on the detected image of the right eye and the detected image of the left eye.

Additionally, each of the parallax barrier clusters may include one or more layers of parallax barrier elements. One of the layers may be capable of being displaced relative to another layer in a direction perpendicular to a lengthwise direction of the parallax barrier elements and parallel to a surface of the display.

Additionally, the device may include a second parallax barrier over the first parallax barrier. The second parallax barrier may include parallax barrier clusters that run perpendicular to the first parallax barrier clusters.

Additionally, the method may further include turning the first parallax barrier transparent when the device is in a portrait mode for displaying stereoscopic images, and turning the second parallax barrier transparent when the device is in a landscape mode for displaying stereoscopic images.

Additionally, moving the parallax barrier elements may include increasing or decreasing a pitch between the parallax barrier elements.

Additionally, increasing the pitch may increase a width of the parallax barrier clusters.

Additionally, moving the parallax barrier elements may include displacing the parallax barrier elements in a direction perpendicular to a lengthwise direction of the parallax barrier elements.

According to yet another aspect, a non-transitory computer-readable medium may include instructions for causing one or more processors executing the instructions to determine a first distance between a viewer and a display of a device based on an output of an auto-focusing component, wherein the display includes a first parallax barrier including a plurality of parallax barrier clusters and wherein each of the parallax barrier clusters includes a plurality of parallax barrier elements that are parallel to one another and parallel to the parallax barrier clusters. The non-transitory computer-readable medium may also include instructions for causing the one or more processors executing the instructions to capture an image of a face of the viewer, detect an image of a right eye of the viewer and an image of a left eye of the viewer in the image of the face of the viewer, determine a second distance between the right eye of the viewer and the left eye of the viewer based on the image of the right eye and the image of the left eye; move the parallax barrier elements in the parallax barrier clusters to control spacing between the parallax barrier clusters, and send, from the display, light rays of a right-eye image of a stereoscopic image and a left-eye image of the stereoscopic image to the right eye of the viewer and the left eye of the viewer, respectively, through the spacing between the parallax barrier clusters.

Additionally, the instructions may include instructions for causing the one or more processors executing the instructions to determine an angle between light rays from the right eye image to the right eye of the viewer and light rays from the left-eye image to the left-eye of the viewer.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. In addition, the terms "viewer" and "user" are used interchangeably.

Overview

Figure 1:
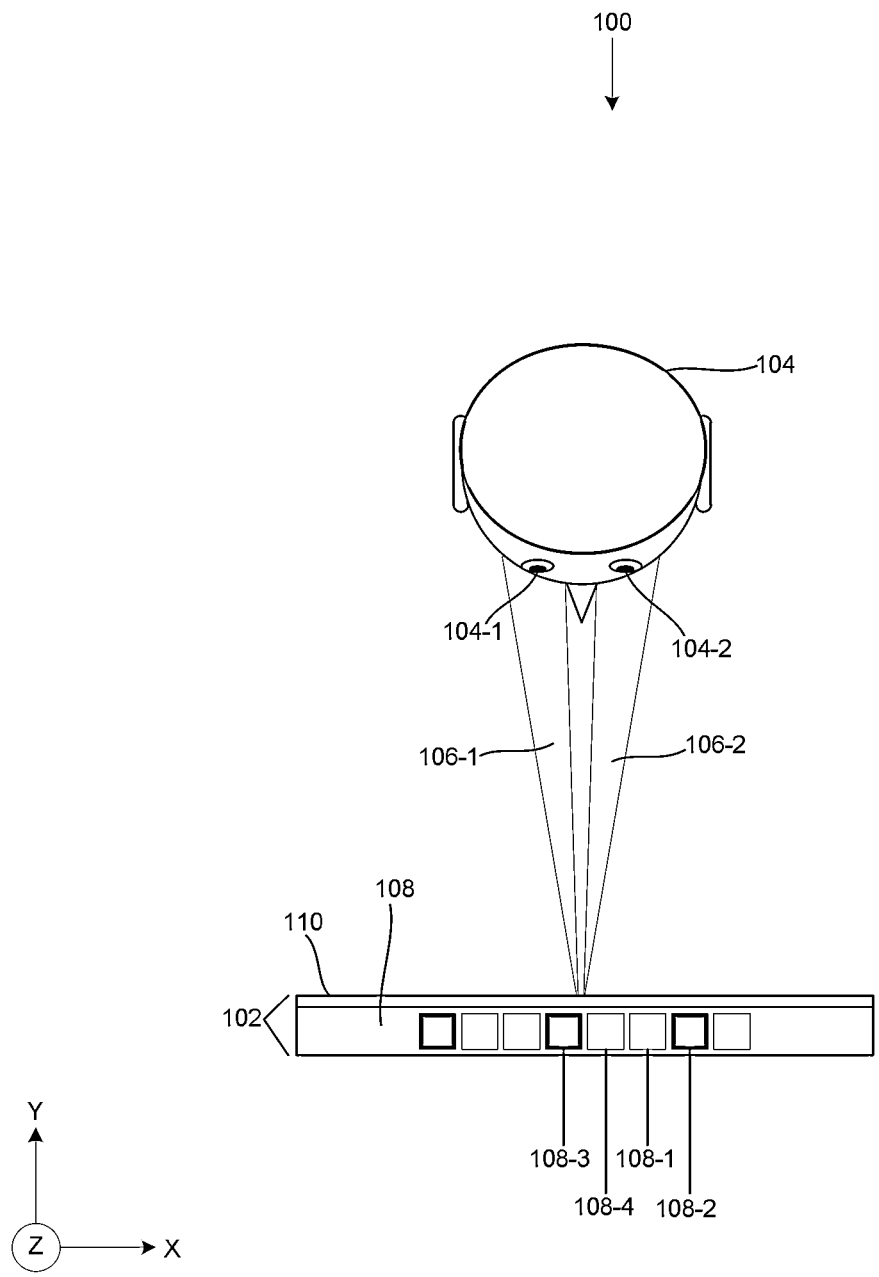
FIG. 1 is a diagram of an exemplary three-dimensional (3D) system in which concepts described herein may be implemented.

Aspects described herein provide a visual three-dimensional (3D) effect based on viewer tracking and controlling a parallax barrier. As further described below, the parallax barrier may be implemented and operated in different ways. FIG. 1 is a diagram of an exemplary 3D system 100 in which concepts described herein may be implemented. As shown, 3D system 100 may include one or more of device 102. Device 102 may generate and provide two-dimensional (2D) or 3D images to a viewer 104 via a display. When device 102 shows a 3D image, the right eye 104-1 and the left eye 104-2 of viewer 104 may receive portions of a right-eye image and a left-eye image via light rays 106-1 and 106-2 that emanate from device 102. Light rays 106-1 and 106-2 may carry different visual information, such that, together, they provide a portion of a stereoscopic image to viewer 104.

Device 102 may include a display 108, parallax barrier 110, and other components (not shown for simplicity). Display 108 may include picture elements (pixels) for displaying images for right eye 104-1 and left eye 104-2. In FIG. 1, pixels 108-1 and 108-3 are part of right-eye images and pixels 108-2 and 108-4 are part of left-eye images. The size and number of pixels on FIG. 1 are for illustration, and a typical 3D display may include greater and smaller pixels than pixels 108-1 through 108-4 in FIG. 1.

Parallax barrier 110 ensures that light rays from right-eye image pixels reach right eye 104-1 and light rays from left-eye image pixels reach left eye 104-2. Parallax barrier 110 accomplishes this by blocking certain light rays from reaching either right eye 104-1 or left eye 104-2.

Viewer 104 may receive light rays from device 102. In some implementations, viewer 104 may wear a pair of 3D glasses, to obtain an improved view of 3D images. In other implementations, rather than using a pair of 3D glasses, viewer 104 may rely on device 102 to select and send right-eye images and left eye images to right eye 104-1 and left eye 104-2, respectively.

In FIG. 1, device 102 may not radiate or transmit the left-eye image and the right-eye image in an isotropic manner. Accordingly, at certain locations, viewer 104 may receive the best-quality stereoscopic image that device 102 is capable of conveying. As used herein, the term "sweet spots" may refer to locations at which viewer 104 can perceive relatively high quality stereoscopic images. At other locations, viewer 104 may receive incoherent images. As used herein, the term "pseudo-stereoscopic image" may refer to the incoherent images.

In FIG. 1, viewer 104's position or location relative to device 102 may change. The change in the relative position may result from viewer 104's movement (e.g., translation, rotation, etc.) or from device 102's movement (e.g., translation, rotation, etc.). When viewer 104's relative location changes, parallax barrier 110 may change its configuration to select light rays from corresponding right-eye and left-eye images on display 108, for transmission to right-eye 104-1 and left-eye 104-2, respectively, such that viewer 104 continues to perceive 3D images. For example, to continue to provide viewer 104 with 3D images, parallax barrier 110 permits/guides light rays 106-1 and 106-2 to right eye 104-1 and left eye 104-2, respectively.

Exemplary Device

Figures 2A, 2B:
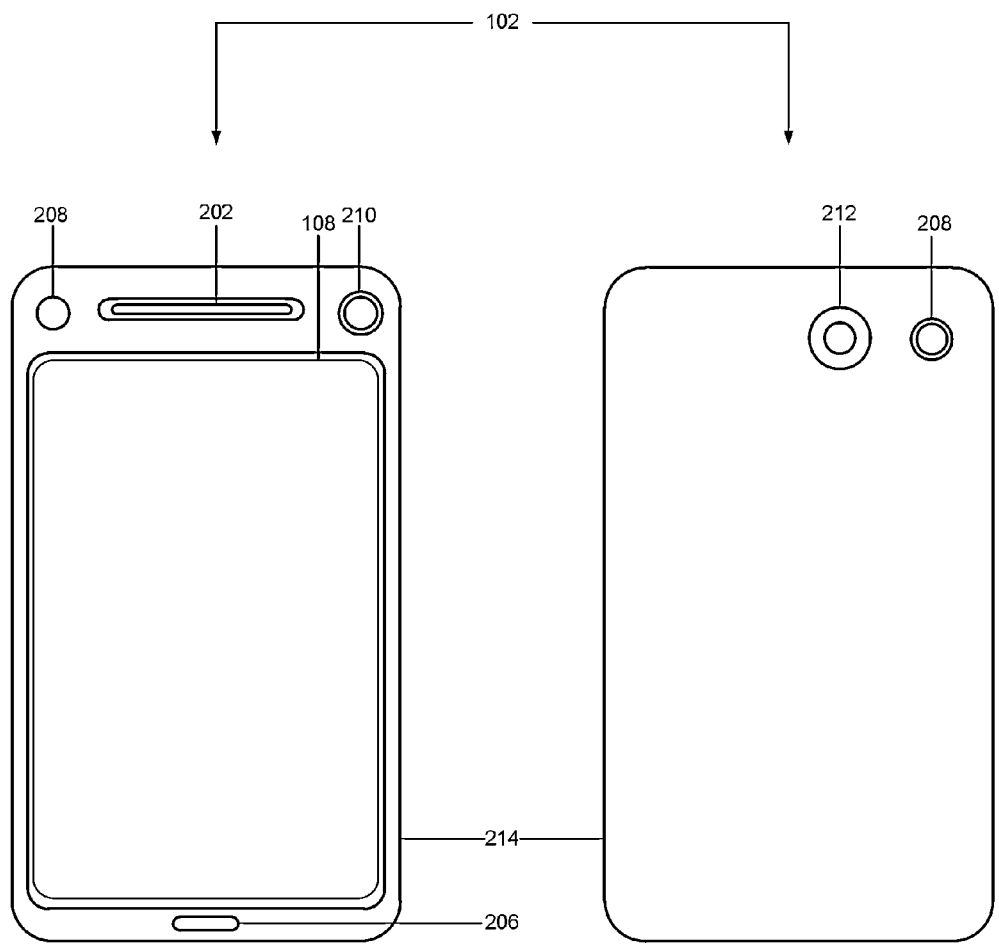
FIGS. 2A and 2B are front and rear views of one implementation of an exemplary device of FIG. 1.

FIGS. 2A and 2B are front and rear views of one implementation of device 102. Device 102 may include any of the following devices that have the ability to or are adapted to display 2D and 3D images, such as a cell phone or a mobile telephone with a 3D display (e.g., smart phone); a tablet computer; an electronic notepad, a gaming console, a laptop, and/or a personal computer with a 3D display; a personal digital assistant (PDA) that can include a 3D display; a peripheral (e.g., wireless display, etc.); a digital camera; or another type of computational or communication device with a 3D display, etc.

As shown in FIGS. 2A and 2B, device 102 may include a speaker 202, display 108, a microphone 206, sensors 208, a front camera 210, a rear camera 212, and housing 214. Speaker 202 may provide audible information to a user/viewer of device 102.

Display 108 (also referred to as "3D display 108") may provide two-dimensional or three-dimensional visual information to the user. Display 108 may include an auto-stereoscopic 3D display, a stereoscopic 3D display, a volumetric display, etc. Display 108 may include pixels that emit different light rays to viewer 104's right eye 104-1 and left eye 104-2, through parallax barrier 110 (FIG. 1) that covers the surface of display 108. In one implementation, parallax barrier 110 may dynamically change the directions in which the light rays are emitted from the surface of display 108, depending on input from device 102. In some implementations, display 108 may also include a touch-screen, for receiving user input.

Microphone 206 may receive audible information from the user. Sensors 208 may collect and provide, to device 102, information pertaining to device 102 (e.g., movement, orientation, etc.), information that is used to aid viewer 104 in capturing images (e.g., for providing information for auto-focusing to front/rear cameras 210/212) and/or information tracking viewer 104 (e.g., proximity sensor). For example, sensor 208 may provide acceleration and orientation of device 102 to internal processors. In another example, sensors 208 may provide the distance and the direction of viewer 104 relative to device 102, so that device 102 can determine how to control parallax bather 110. Examples of sensors 208 include an accelerometer, gyroscope, ultrasound sensor, an infrared sensor, a camera sensor, a heat sensor/detector, etc.

Front camera 210 and rear camera 212 may enable a user to view, capture, store, and process images of a subject located at the front/back of device 102. Front camera 210 may be separate from rear camera 212 that is located on the back of device 102. In some implementations, device 102 may include yet another camera at either the front or the back of device 102, to provide a pair of 3D cameras on either the front or the back. In some implementations, device 102 may process images that are received via front camera 210 to detect and track eyes of a subject in front of device 102. Housing 214 may provide a casing for components of device 102 and may protect the components from outside elements.

Figure 3:
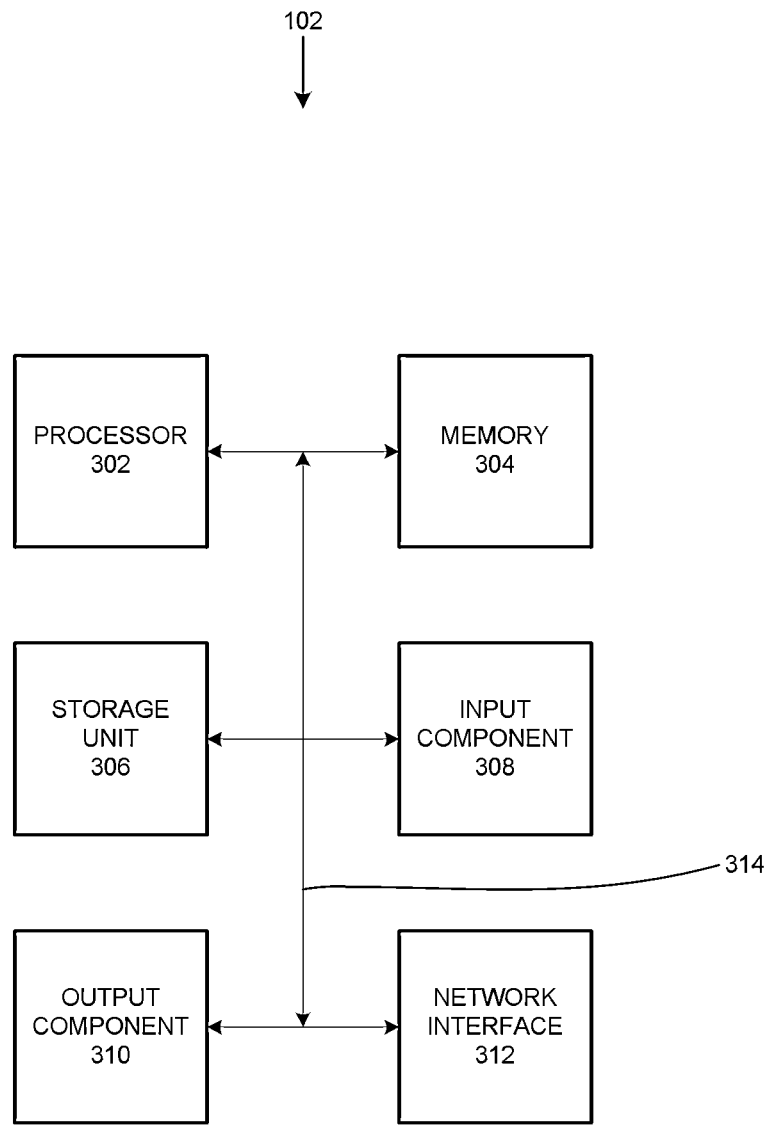
FIG. 3 is a block diagram of components of the device of FIG. 1.

FIG. 3 is a block diagram of device 102. As shown, device 102 may include a processor 302, a memory 304, storage unit 306, input component 308, output component 310, a network interface 312, and a communication path 314. In different implementations, device 102 may include additional, fewer, or different components than the ones illustrated in FIG. 3.

Processor 302 may include a processor, a microprocessor, an Application Specific Integrated Circuit (ASIC), a Field Programmable Gate Array (FPGA), and/or other processing logic capable of controlling device 102. In one implementation, processor 302 may include components that are specifically designed to process 3D images. Memory 304 may include static memory, such as read only memory (ROM), and/or dynamic memory, such as random access memory (RAM), or onboard cache, for storing data and machine-readable instructions.

Storage unit 306 may include a magnetic and/or optical storage/recording medium. In some embodiments, storage unit 306 may be mounted under a directory tree or may be mapped to a drive. Depending on the context, the term "medium," "memory," "storage," "storage device," "storage medium," and/or "storage unit" may be used interchangeably. For example, a "computer-readable storage device," "computer-readable medium," or "computer readable storage medium" may refer to both a memory and/or a storage device.

Input component 308 may permit a user to input information to device 102. Input component 308 may include, for example, a keyboard, a keypad, a mouse, a pen, a microphone, a touch screen, voice recognition and/or biometric mechanisms, sensors, etc. Output component 310 may output information to the user. Output component 310 may include, for example, a display, a printer, a speaker, etc.

Network interface 312 may include a transceiver that enables device 102 to communicate with other devices and/or systems. For example, network interface 312 may include mechanisms for communicating via a network, such as the Internet, a terrestrial wireless network (e.g., a WLAN), a satellite-based network, a personal area network (PAN), a WPAN, etc. Additionally or alternatively, network interface 312 may include a modem, an Ethernet interface to a LAN, and/or an interface/connection for connecting device 102 to other devices (e.g., a Bluetooth interface).

Communication path 314 may provide an interface through which components of device 102 can communicate with one another.

Figure 4:
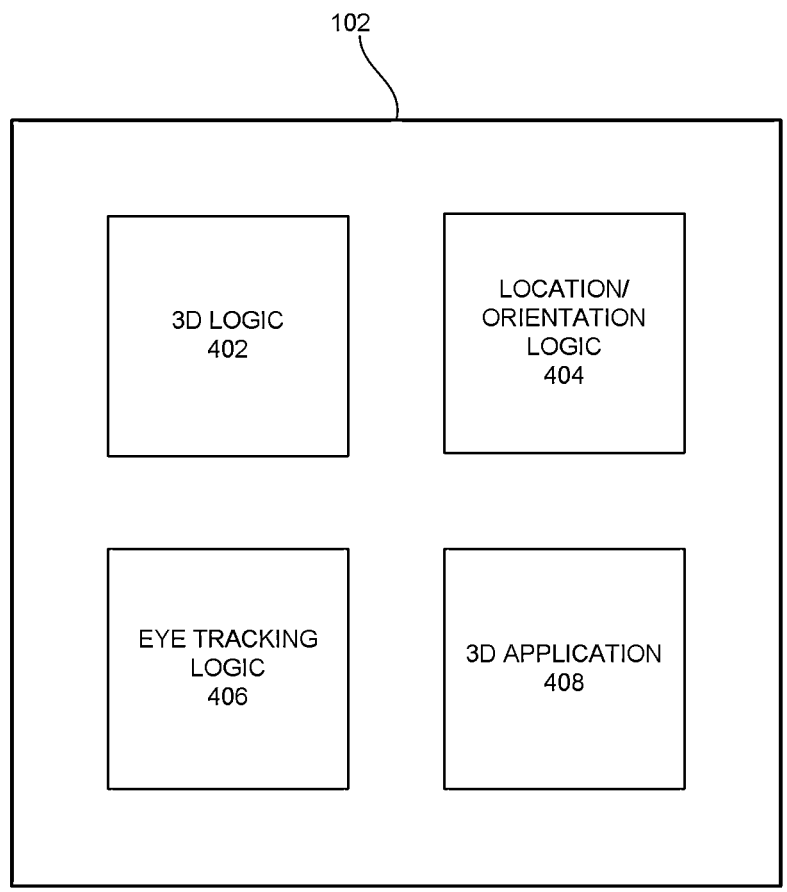
FIG. 4 is a block diagram of exemplary functional components of the device of FIG. 1.

FIG. 4 is a functional block diagram of device 102. As shown, device 102 may include 3D logic 402, location/orientation logic 404, eye-tracking logic 406, and 3D application 408. Although not illustrated in FIG. 4, device 102 may include additional functional components, such as the components that are shown in FIG. 4, an operating system (e.g., Windows Mobile OS, Blackberry OS, Linux, Android, iOS, Windows Phone, etc.), an application (e.g., an instant messenger client, an email client, etc.), etc.

3D logic 402 may include hardware and/or software components for obtaining right-eye images and left-eye images and/or providing the right/left-eye images to a 3D display (e.g., display 108). In obtaining the right-eye and left-eye images, 3D logic 402 may receive right- and left-eye images from stored media content (e.g., a 3D movie). In other implementations, 3D logic 402 may generate the right and left-eye images of a 3D model or object for different pixels or sub-pixels. In such instances, device 102 may obtain projections of the 3D object onto 3D display 108. Once the images are obtained, 3D logic 402 may control parallax barrier 110 such that light rays for right eye 104-1 and left eye 104-2 are transmitted to their respective eyes.

In some implementations, 3D logic 402 may receive viewer input for selecting a sweet spot. In one implementation, when a viewer selects a sweet spot (e.g., by pressing a button on device 102), device 102 may store values of control variables that characterize parallax barrier 110, the location/orientation of device 102, and/or the relative location of viewer 104. In another implementation, when the user selects a sweet spot, device 102 may recalibrate parallax barrier 110 such that the stereoscopic images are sent to the selected spot. In either case, as the viewer's relative location moves away from the established sweet spot, 3D logic 402 may determine (e.g., calculate) new directions to which light rays must be guided via parallax barrier 110.

In some implementations, the location/orientation of device 102 may affect the relative location of a sweet spot. To allow the viewer to perceive 3D images without interruption, it may be necessary for device 102 to lock the sweet spot for the viewer. This may entail making proper adjustments to the angles at which the light rays from device 102 are directed, via parallax barrier 110. Locking the sweet spot may be helpful for the viewer, for example, when device 102 and/or viewer 104 is relatively unstable (e.g., device 102 is being held by a hand or viewer 104's head moves). As described below, depending on the implementation, 3D logic 402 may make different types of adjustments to parallax barrier 110.

Location/orientation logic 404 may determine the location/orientation of device 102 and provide location/orientation information to 3D logic 402, eye tracking logic 406, and/or 3D application 408. In one implementation, location/orientation logic 404 may obtain the information from a Global Positioning System (GPS) receiver, gyroscope, accelerometer, camera, etc. in device 102.

Eye tracking logic 406 may include hardware and/or software (e.g., a range finder, proximity sensor, cameras, image detector, etc.) for tracking viewer 104's eyes and providing the location/position of viewer 104's eyes to 3D logic 402. In some implementations, eye tracking logic 406 may include sensors (e.g., sensors 208) and/or logic for determining a location of viewer 104's head and/or eyes based on sensor inputs (e.g., distance information from sensors or an auto-focus component, an image of a face, an image of eyes 104-1 and 104-2 from cameras, a distance between the eyes based on image recognition (e.g., eye-recognition), etc.), and an angle between light rays (which originate from a point on display 102) for right eye 104-1 and light rays for left eye 104-2.

3D application 408 may include hardware and/or software that show 3D images on display 108. In showing the 3D images, 3D application 408 may use 3D logic 402, location/orientation detector 404, and/or eye tracking logic 406 to generate 3D images and/or provide the 3D images to display 108. Examples of 3D application 408 may include a 3D graphics game, a 3D movie player, and/or any other application in which 3D images are shown in place of 2D images.

Figure 5:
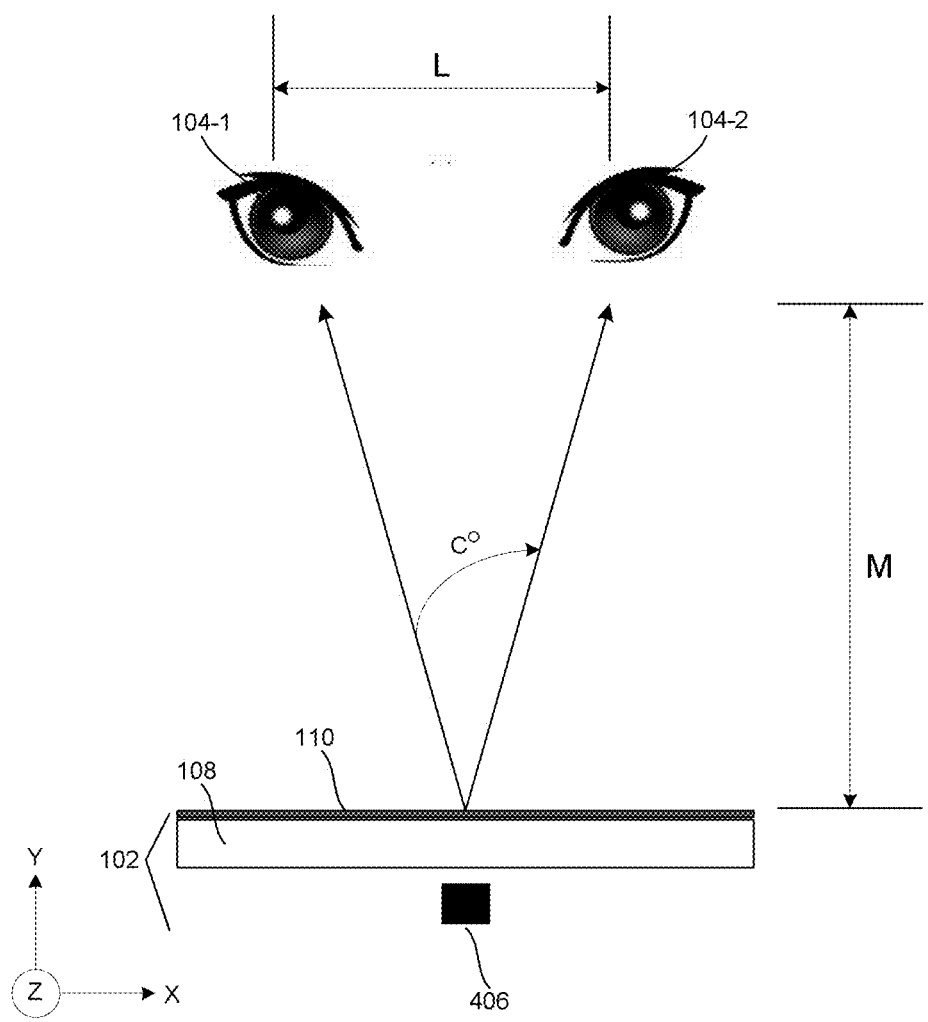
FIG. 5 illustrates exemplary operation of the device of FIG. 1 according to one embodiment.

FIG. 5 illustrates exemplary operation of device 102 according to one embodiment. Based on output from eye-tracking logic 406, device 102 may obtain both distance M from device 102 to viewer 104's eyes 104-1 and 104-2 and a distance L between viewer 104's eyes 104-1 and 104-2. Eye-tracking logic 406 may obtain distance M based on, for example, auto-focusing, proximity sensor, range-finder, ultrasound sensor, infrared sensor, etc. Eye tracking logic 406 may obtain distance L based on, for example, eye detection (e.g., image recognition) and may determine the distance L between the detected eyes. Once eye-tracking logic 406 determines L and M, eye-tracking logic 406 (or another component in device 102) may determine the desired angle C° between light rays that are to reach right eye 104-1 and light rays that are to reach left eye 104-2 to provide viewer 104 with 3D images, based on, for example, the following expression:

$$C° = 2 \tan^{-1}(L/2M) \quad (1)$$

In expression (1), it is assumed that the actual distance from a sensor in device 102 to viewer 104's eyes 104-1 and 104-2 is approximately equal to distance M. In other implementations, device 102 may account for the location of the sensor within device 102 to obtain a more accurate value for angle C°. Once device 102 obtains C° (or L and M), device 102 may control parallax barrier 110 to direct the light rays for right eye 104-1 and left eye 104-2 in accordance with desired angle C°.

Figure 6:
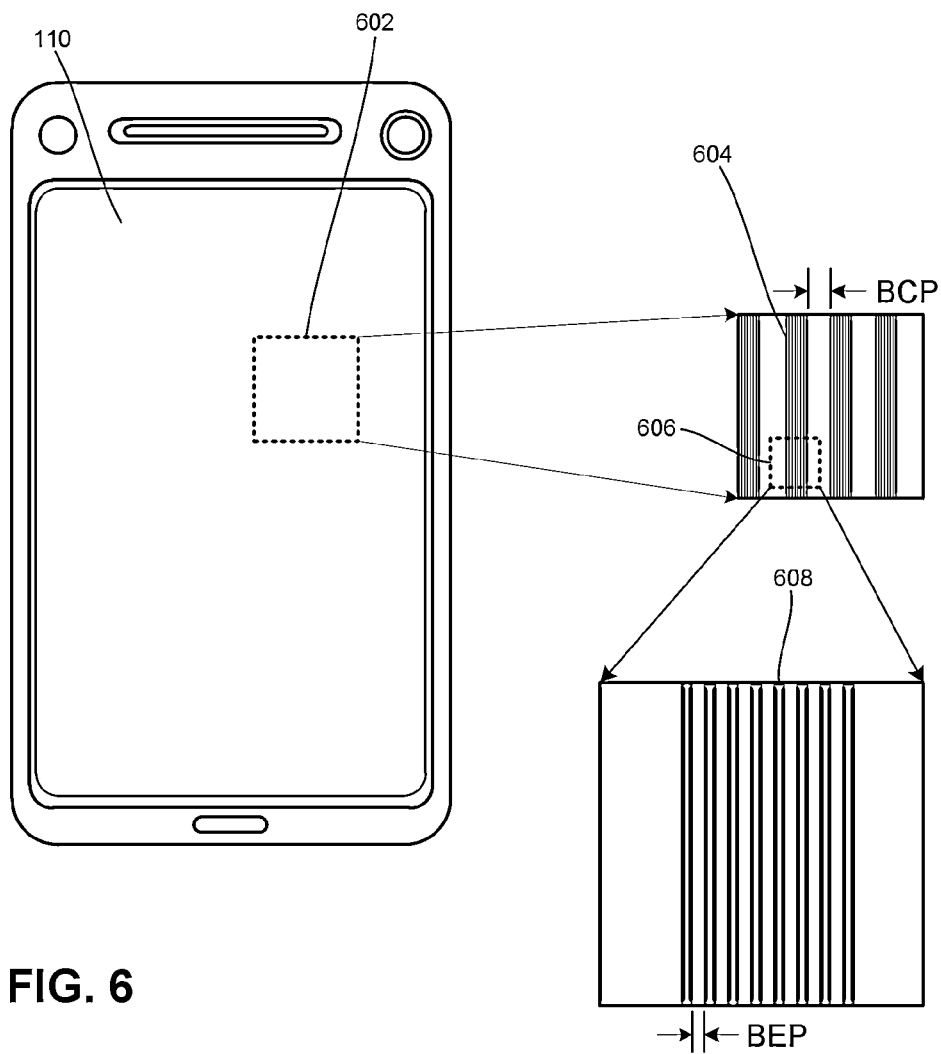
FIG. 6 illustrates an exemplary parallax barrier that is overlaid on and/or is part of the display of FIG. 2A according to one embodiment.

FIG. 6 illustrates parallax barrier 110 that is overlaid on and/or is part of display 108 (see FIG. 2A). In FIG. 6, an exploded view of a square portion 602 of parallax barrier 110 shows that parallax barrier 110 includes vertically running (relative to the portrait position of display 108) barrier clusters, one of which is shown as barrier cluster 604. As further shown in an exploded view of a square portion 606, barrier cluster 604 may include barrier elements, one of which is shown as barrier element 608.

To change directions of light rays that are emanating from display 108, device 102 may modify the distance BCP (barrier cluster pitch) between barrier clusters. This may be accomplished by changing distances BEP (barrier element pitch) between barrier elements. FIG. 6 shows both the BCP and the BEP. As the BEP between barrier elements increases, each barrier cluster spreads wider, and the BCP between barrier clusters becomes narrower relative to the width of the barrier clusters, thus, changing channels (in parallax barrier 110) that permit certain light rays from reaching viewer 104's right eye 104-1 or left eye 104-2.

Figure 7A:
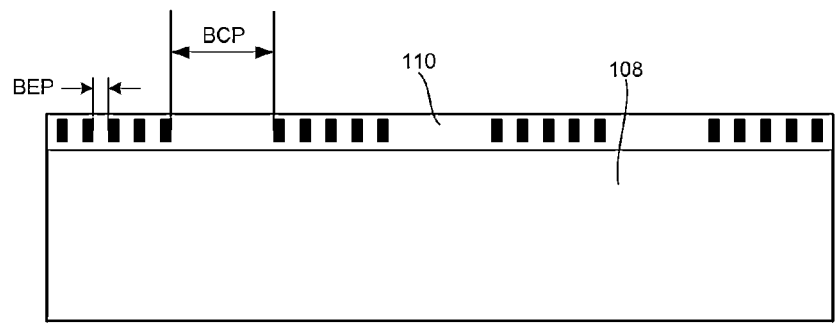
FIG. 7A is an exemplary cross-sectional side view of the display of FIG. 6.

FIG. 7A is an exemplary cross-sectional side view of display 108 in FIG. 6. As shown in FIG. 7A, the BEP/BCP ratio may change as a function of changes in individual spacing BEP between barrier elements. Depending on the implementation, the BCP itself may or may not change as the BEP changes, depending on the substrate in which barrier elements are embedded in parallax barrier 110.

Figure 7B:
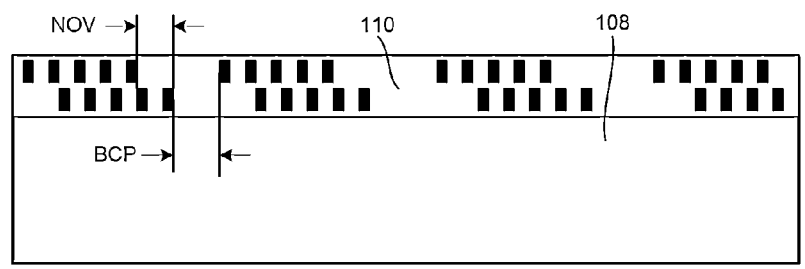
FIG. 7B is an exemplary cross-sectional side view of the display of the device of FIG. 2A according to another embodiment.

FIG. 7B is an exemplary cross-sectional side view of display 108 according to another implementation. In this implementation, each parallax barrier cluster includes two layers of parallax barrier elements. As shown, the two layers may be configured to slide relative to one another. As the non-overlapping (NOV) distance between the layers increases, the BCP decreases. Accordingly, 3D logic 402 may change the directions in which device 102 emits light rays from a pixel to viewer 104's right eye 104-1 and left eye 104-2 by changing the positions of the two layers of barrier clusters.

Figure 8:
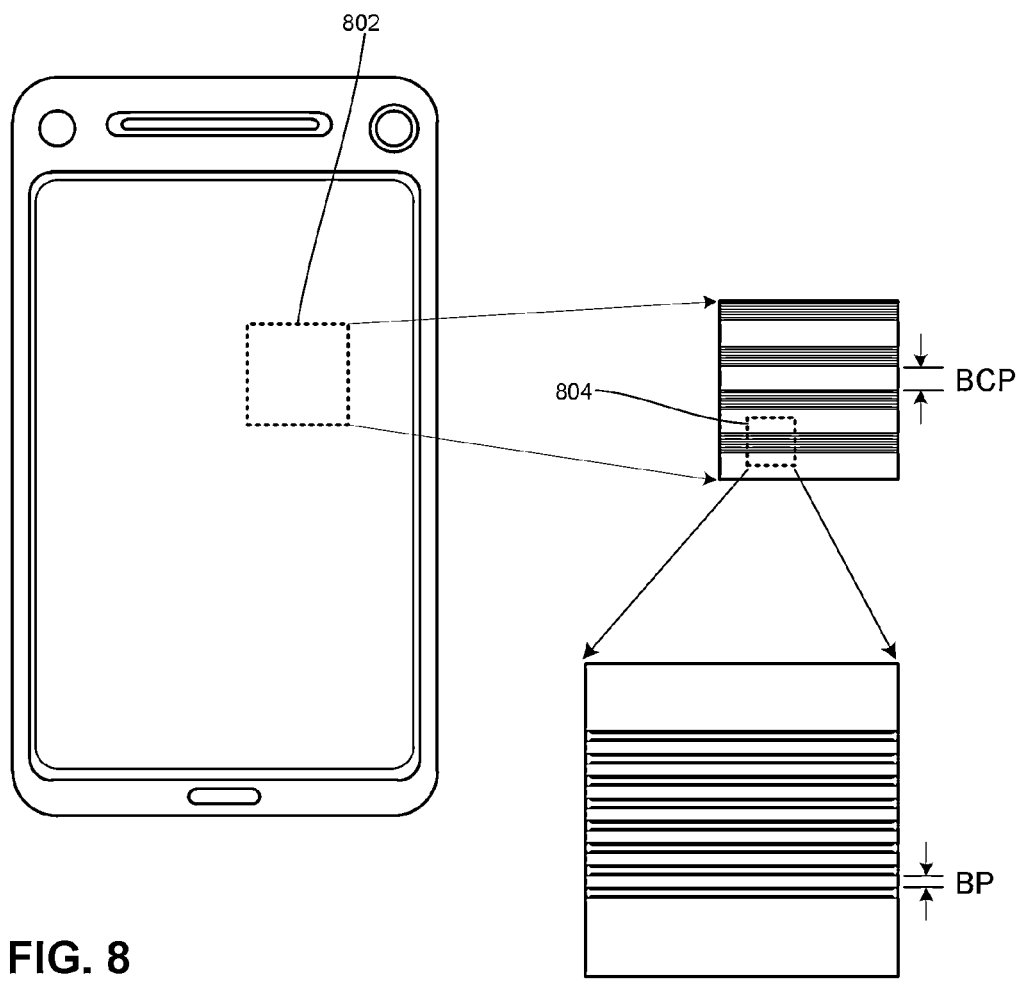
FIG. 8 illustrates an exemplary parallax barrier that is overlaid on and/or is part of the display of FIG. 2A according to another embodiment.

FIG. 8 illustrates an exemplary parallax barrier that is overlaid on and/or is part of display 108 (see FIG. 2A) according to another embodiment. In this embodiment, in contrast to FIG. 6, parallax barrier clusters and parallax barrier elements run horizontally (relative to the portrait position of display 108).

As in the embodiment described above with reference to FIG. 6, to change directions of light rays that are emanating from display 108, device 102 may modify the distance BCP (barrier cluster pitch) between the barrier clusters. This may be accomplished by changing distances BEP (barrier element pitch) between the barrier elements.

The horizontally running barrier elements and clusters may be controlled or configured similarly as vertically running barrier elements and/or clusters illustrated in FIGS. 6, 7A, and 7B. In FIG. 8, however, the BCP, BEP, and NOV may refer to vertical spacing between various barrier components.

Figure 9A:
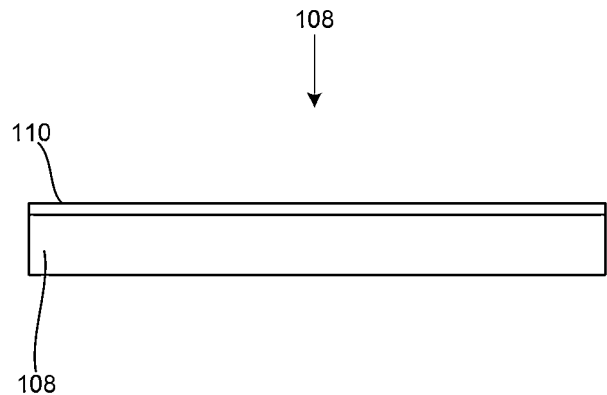
FIGS. 9A through 9C are cross-sectional side views of the display of the device of FIG. 1 according to different embodiments.
Figure 9B:
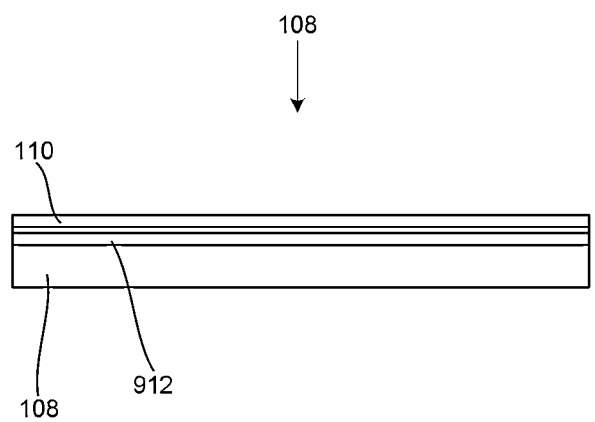
Figure 9C:
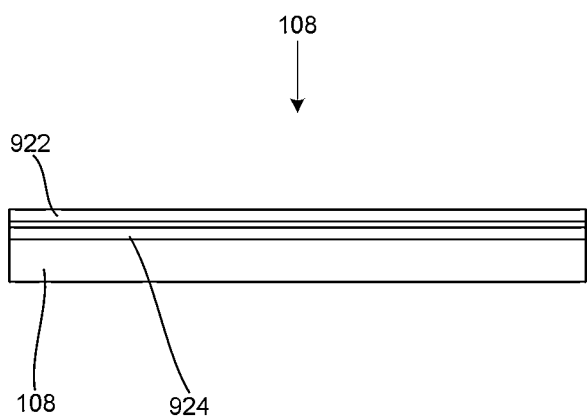

FIGS. 9A through 9C are cross-sectional side views of display 108 according to different embodiments. FIG. 9A is a cross-sectional side view of display 108 according to the embodiment illustrated in FIGS. 6, 7A, and 7B. In this embodiment, display 108 includes a single parallax barrier 110.

FIG. 9B is a cross-sectional side view of display 108 according to another embodiment. In this embodiment, display 108 includes two layers of parallax barriers 110 and 912. Parallax barrier 110 includes parallax barrier elements that run vertically relative to display 108 in the portrait position (see FIG. 6). Parallax barrier 912 includes parallax barrier elements that run horizontally relative to display 108 in the portrait position (see FIG. 8). In this embodiment, device 102 may adjust parallax barriers 110 and 912 to change the directions of light rays for eyes that are positioned to view display 108 in either the portrait or landscape mode.

FIG. 9C is a cross-sectional side view of display 108 according to yet another embodiment. In this embodiment, display 108 includes two layers of parallax barriers 922 and 924. As in FIG. 9B, parallax barrier elements of parallax barriers 922 and 924 run vertically and horizontally relative to the portrait position of display 108. However, in contrast to parallax barriers 110 and 912, each of parallax barriers 922 and 924 may be made of devices with the ability to turn transparent or opaque (e.g., active matrix organic light emitting diode (AMOLED)). Thus, for example, when viewer 104 is looking at display 108 in the portrait mode, parallax barrier 924 may turn transparent. Parallax barrier 922, which is not transparent, may then select light rays for right eye 104-1 and left eye 104-2 to convey clear 3D images to viewer 104. In the landscape mode, parallax barrier 922 may turn transparent, and parallax barrier 924 may guide the light rays from device 102 to viewer 104 to convey 3D images. In some instances, both of parallax barriers 922 and 924 may be operation.

Figure 10:
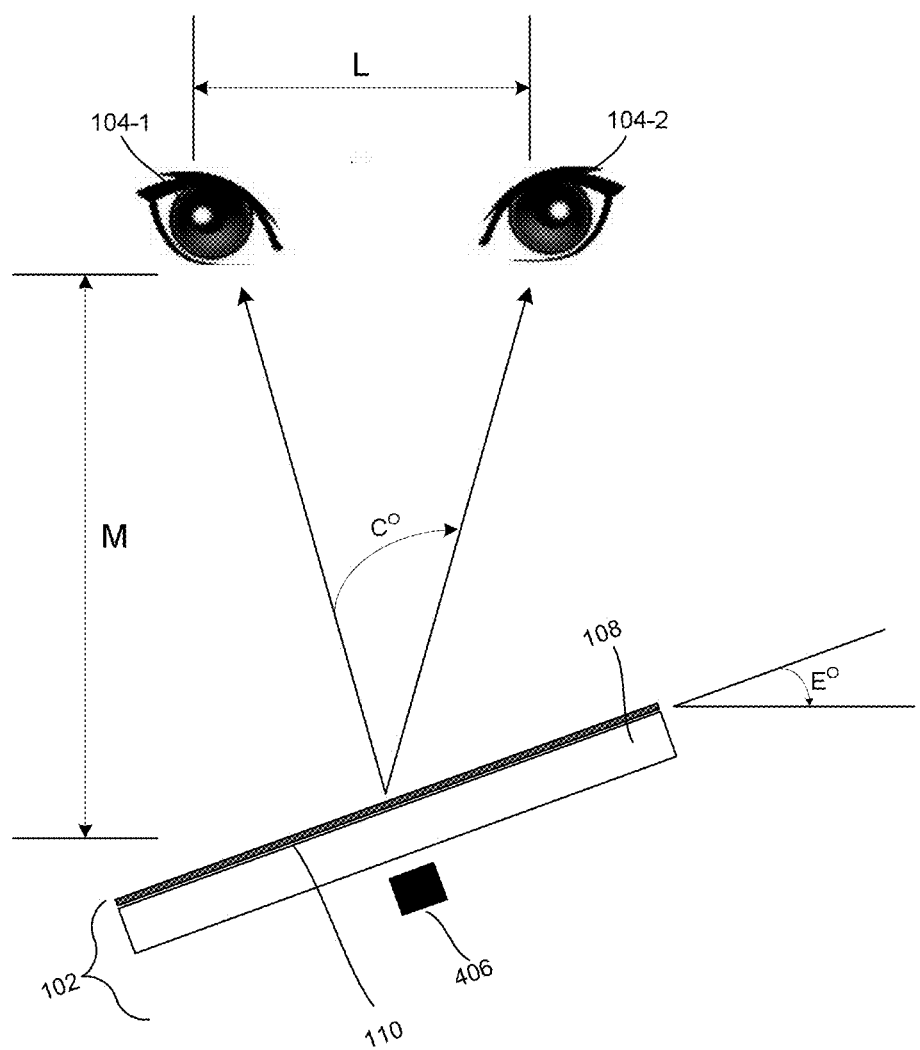
FIG. 10 illustrates exemplary operation of the parallax barrier of the device of FIG. 1 when the device is tilted relative to a viewer.

FIG. 10 illustrates exemplary operation of parallax barrier 110 when device 102 is tilted relative to viewer 104. As shown, when device 104 is tilted, 3D logic 402 may not directly use the distances L and M to direct the light rays from display 108, but adjust the angle of the rays to account for the tilting angle E°. Angle C° in FIG. 10 is the same angle C° in FIG. 5.

Exemplary Process for Adjusting Parallax Barriers

Figure 11:
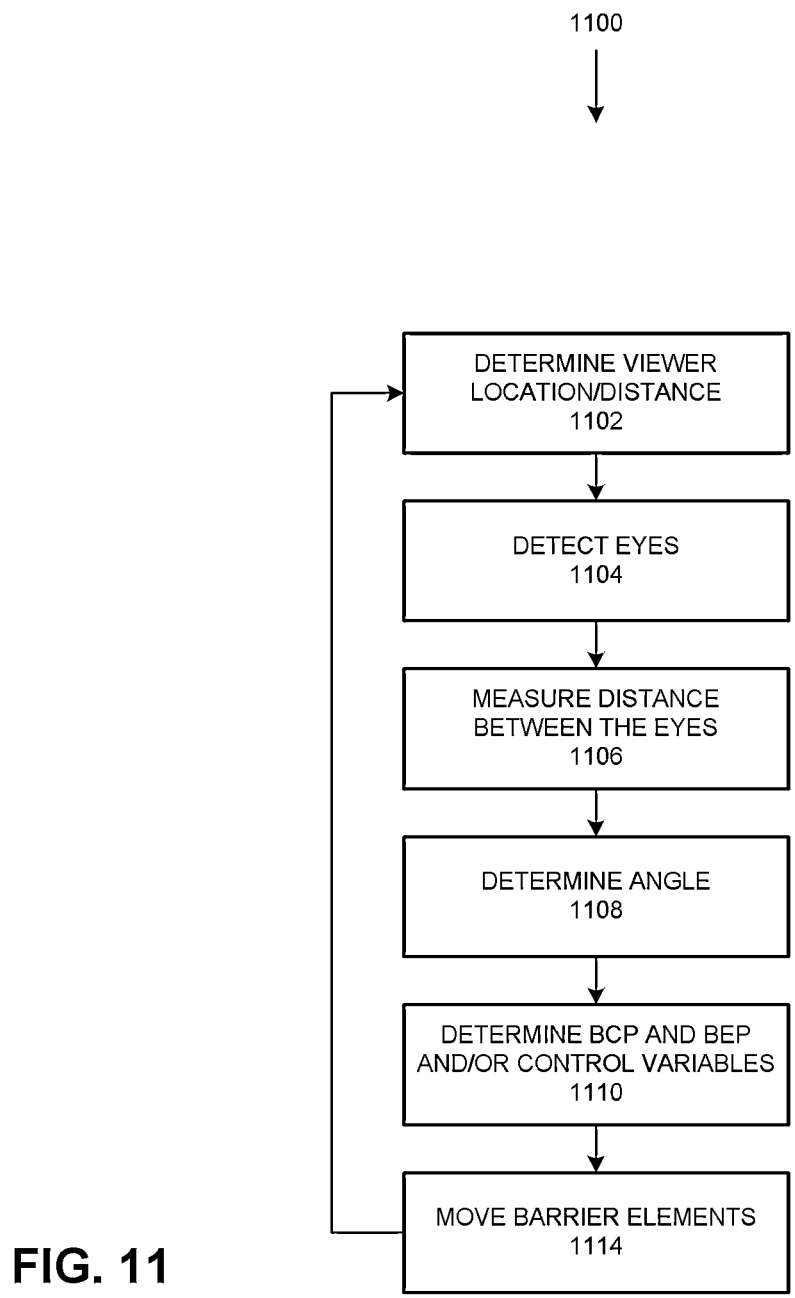
FIG. 11 is a flow diagram of an exemplary process for that is associated with operation of the device of FIG. 1.

FIG. 11 is a flow diagram of an exemplary process 1100 that is associated with operation of device 102. Process 1100 may include device 102 determining viewer location and viewer distance from device 102 (block 1102). As discussed above, device 102 may determine the viewer location and viewer distance via a sensor, such as an auto-focusing mechanism, proximity sensor, range-finder, infrared sensor, ultrasound sensor, camera (e.g., head detection), etc.

Device 102 may detect viewer 104's eyes (block 1104). Device 102 may detect viewer 104's eyes based on images of viewer 104's face, which may be obtained with the aid of auto-focusing mechanism(s), and applying image recognition (e.g., eye detection). Furthermore, upon recognizing, detecting, or identifying viewer 104's eyes, device 102 may measure the distance between viewer 104's right eye 104-1 and left eye 104-2 (block 1106). In some implementations, device 102 may also obtain the positions (e.g., positions relative to device 102 in device 102's coordinate system) of right eye 104-1 and left eye 104-2.

Device 102 may determine the angle (e.g., angle C°) between light rays, from display 104, that reach right eye 104-1 and light rays that reach left eye 104-2 (block 1108). In some implementations, device 102 may omit block 1108 (e.g., depending on how device 102 calculates the values of control variables for controlling parallax barrier elements).

Based on the distance between device 102 and viewer 104, distance between right eye 104-1 and left eye 104-2, and/or the angle C°, device 102 may determine BCP, BEP, and/or values of other control variables (e.g., a displacement for each of the layers of parallax barrier clusters (See FIG. 8) (block 1110).

Device 102 may move the barrier elements and/or barrier clusters in accordance with BCP, BEP, and/or the other control variable values (block 1112). After block 1112, process 1100 may return to block 1102.

Conclusion

The foregoing description of implementations provides illustration, but is not intended to be exhaustive or to limit the implementations to the precise form disclosed. Modifications and variations are possible in light of the above teachings or may be acquired from practice of the teachings.

In the above, while a series of blocks has been described with regard to exemplary processes 1100 illustrated in FIG. 11, the order of the blocks in processes 1100 may be modified in other implementations. Non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:
1. A device comprising:
a display screen to display a stereoscopic image to a viewer, the stereoscopic image comprising a right-eye image and a left-eye image;
a sensor to measure a first distance between the viewer and the device;
a first parallax barrier that covers a surface of the display screen, the surface transmitting the stereoscopic image toward the viewer, wherein the first parallax barrier comprises a predetermined number of parallax barrier clusters that are parallel to one another and spaced apart from one another by a barrier cluster pitch distance, and wherein each of the parallax barrier clusters includes a predetermined number of parallax barrier elements that are parallel to one another and parallel to the parallax barrier clusters and spaced apart from one another by a barrier element pitch distance;
one or more processors configured to:
determine the first distance based on output from the sensor;
determine a second distance between a right eye of the viewer and a left eye of the viewer;
move the parallax barrier elements in each parallax barrier cluster based on the first distance and the second distance to change the barrier element pitch distance between adjacent pairs of parallax barrier elements in the respective parallax barrier cluster, the changing of the barrier element pitch distance inversely changing the barrier cluster pitch distance between adjacent pairs of parallax barrier clusters by the change to the barrier element pitch distance times the number of parallax barrier elements in the parallax barrier cluster minus one parallax barrier element, and wherein the changes in barrier element pitch distance and bar- rier cluster pitch distance are variable and not limited to a predetermined incremental amount or multiple thereof; and emit, from the display screen and through spaces between the parallax barrier clusters, light rays from the right-eye image toward the right eye of the viewer and light rays from the left-eye image toward the left eye of the viewer.

2. The device of claim 1, wherein the device includes at least one of:

a tablet computer, a cellular phone, and a laptop computer.

3. The device of claim 1, further comprising:

a camera to capture an image of a face of the viewer, wherein the one or more processors are further configured to:

auto-focus the image of the face;

detect an image of the left eye in the image of the face;

detect an image of the right eye in the image of the face; and determine the second distance between the right eye and the left eye based on the detected images of the right eye and the left eye.

4. The device of claim 1, wherein the sensor includes a sensor for auto-focusing a camera.

5. The device of claim 1, wherein the sensor includes at least one of:

an infrared sensor, an ultrasound sensor, a range-finder, and a proximity sensor.

6. The device of claim 1, further comprising a second parallax barrier that overlays the first parallax barrier, wherein the second parallax barrier includes parallax barrier clusters that run perpendicularly to the first parallax barrier clusters.

7. The device of claim 6, wherein the one or more processors are further configured to:

turn the first parallax barrier transparent when the device is in a portrait mode; and turn the second parallax barrier transparent when the device is in a landscape mode.

8. The device of claim 1, wherein the one or more processors are further configured to:

determine an angle between light rays from the right eye image to the right eye of the viewer and light rays from the left-eye image to the left eye of the viewer.

9. The device of claim 1, wherein the first parallax barrier includes an upper layer and a lower layer, and wherein each of the parallax barrier clusters includes parallax barrier elements that belong to either the upper layer or the lower layer.

10. A method comprising:

determining a first distance between a viewer and a display of a device, wherein the display comprises a first parallax barrier including a predetermined number of parallax barrier clusters that are parallel to one another and spaced apart from one another by a barrier cluster pitch distance, and wherein each of the parallax barrier clusters includes a predetermined number of parallax barrier elements that are parallel to one another and parallel to the parallax barrier clusters and spaced apart from one another by a barrier element pitch distance;

determining a second distance between a right eye of the viewer and a left eye of the viewer;

moving the parallax barrier elements in each parallax barrier cluster based on the first distance and the second distance to change the barrier element pitch distance between adjacent pairs of parallax barrier elements in the respective parallax barrier cluster, the changing of the barrier element pitch distance inversely changing the barrier cluster pitch distance between adjacent pairs of parallax barrier clusters by the change to the barrier element pitch distance times the number of parallax barrier elements in the parallax barrier cluster minus one parallax barrier element, and wherein the changes in barrier element pitch distance and barrier cluster pitch distance are variable and not limited to a predetermined incremental amount or multiple thereof; and emitting, from the display and through spaces between the parallax barrier clusters, light rays of a right-eye image of a stereoscopic image and a left-eye image of the stereoscopic image to the right eye of the viewer and the left eye of the viewer, respectively.

11. The method of claim 10, wherein determining the first distance includes: measuring the first distance based on an auto-focusing component.

12. The method of claim 10, wherein determining the second distance between the right eye of the viewer and the left eye of the viewer includes:

detecting an image of a right eye in an image of a face of the viewer;

detecting an image of a left eye in the image of the face of the viewer; and determining the second distance based on the detected image of the right eye and the detected image of the left eye.

13. The method of claim 10, wherein the device includes a second parallax barrier over the first parallax barrier, the second parallax barrier including parallax barrier clusters that run perpendicular to the first parallax barrier clusters.

14. The method of claim 13, further comprising:

turning the first parallax barrier transparent when the device is in a portrait mode for displaying stereoscopic images; and turning the second parallax barrier transparent when the device is in a landscape mode for displaying stereoscopic images.

15. A non-transitory computer-readable medium comprising instructions for causing one or more processors executing the instructions to:

determine a first distance between a viewer and a display of a device based on an output of an auto-focusing component, wherein the display comprises a first parallax barrier including a predetermined number of parallax barrier clusters that are parallel to one another and spaced apart from one another by a barrier cluster pitch distance, and wherein each of the parallax barrier clusters includes a predetermined number of parallax barrier elements that are parallel to one another and parallel to the parallax barrier clusters and spaced apart from one another by a barrier element pitch distance;

capture an image of a face of the viewer;

detect an image of a right eye of the viewer and an image of a left eye of the viewer in the image of the face of the viewer;

determine a second distance between the right eye of the viewer and the left eye of the viewer based on the image of the right eye and the image of the left eye;

move the parallax barrier elements in each parallax barrier cluster based on the first distance and the second distance to change the barrier element pitch distance between adjacent pairs of parallax barrier elements in the respective parallax barrier cluster, the changing of the barrier element pitch distance inversely changing the barrier cluster pitch distance between adjacent pairs of parallax barrier clusters by the change to the barrier element pitch distance times the number of parallax barrier elements in the parallax barrier cluster minus one parallax barrier element, and wherein the changes in barrier element pitch distance and barrier cluster pitch distance are variable and not limited to a predetermined incremental amount or multiple thereof; and emit, from the display and through the spaces between the parallax barrier clusters, light rays of a right-eye image of a stereoscopic image and a left-eye image of the stereoscopic image to the right eye of the viewer and the left eye of the viewer, respectively.

16. The non-transitory computer-readable medium of claim 15, wherein the instructions include instructions for causing the one or more processors executing the instructions to:

determine an angle between light rays from the right eye image to the right eye of the viewer and light rays from the left-eye image to the left-eye of the viewer.

* * * * *